Patented June 1, 1948

2,442,539

UNITED STATES PATENT OFFICE 2,422,539

GLYCERIDE REARRANGEMENT

Eddy W. Eckey, Wyoming, Ohio, assignor to The Procter & Gamble Company, Cincinnati, Ohio, a corporation of Ohio No Drawing. Application January 1, 1944, Serial No. 516,705

16 Claims. (Cl. 260—410.7)

My invention relates to controlling the molecular rearrangement of glycerides in processes wherein such rearrangement is caused to take place.

According to my invention the operator may control the relative proportions of high melting, intermediate melting and low melting glycerides resulting from rearrangement of a fat within limits allowed by the composition of the mixed fatty acids constituting the fat. He may at will increase or decrease the relative proportion of mixed saturated-unsaturated triglycerides to saturated triglycerides and/or unsaturated triglycerides in the rearranged product. A given fat by my process within limits allowed by the composition of its constituent fatty acids may be increased or decreased in melting point, and may be modified to have a lesser or a greater spread between softening point and complete melting point than it had prior to rearrangement. Broadly speaking, these results are accomplished by a rearrangement process involving the step of recycling a part of the reaction product.

The fact has long been known that by the use of high temperature, with or without the aid of catalysts sometimes referred to as molecular rearrangement catalysts, the fatty acid radicals of glyeride fats may be shuffed or rearranged thereby producing a resulting glyceride different chemically from the point of view of the distribution of the fatty acid radicals. In such known practices there has been no way of directing the constitution of glycerides obtainable from a given fat composition. In all processes of glyceride rearrangement proposed by others the combination of the fatty acid radicals with the glycerin is governed by the proportions of the different fatty acids in the fat and by their relative reactivities.

In my copending application Serial No. 418,590, filed November 10, 1941, I have described and claimed a novel process whereby the shuffling of the fatty acid radicals of the glycerides can be controlled so as to produce a much larger percentage of solid triglycerides than would occur in non-directed rearrangement processes such as those heretofore proposed. This is accomplished by temperature control which brings about precipitation of solid triglycerides during the molecular rearrangement. In a typical case the process of this copending application will produce a glyceride mixture containing a larger proportion of fully saturated triglycerides and a larger proportion of fully unsaturated triglycerides and a correspondingly smaller proportion of mixed saturated-unsaturated triglycerides than would be obtained from the same glyceride mixture in the ordinary rearrangement processes of the prior art.

In the method herein described and claimed, glyceride rearrangement can be controlled and directed even when the rearrangement is conducted wholly in the liquid phase. Depending on the manner of conducting the process as more fully hereinafter described, the glyceride rearrangement can be influenced in either direction and made either to produce fats containing a larger or smaller proportion of mixed saturated-unsaturated triglycerides and a correspondingly smaller or larger proportion of saturated triglycerides and unsaturated triglycerides than would be obtained by simple rearrangement of a glyceride mixture in accordance with prior art processes.

In general my present process involves the essential step of mixing with the fat to be subjected to ester interchange a fraction of a fat resulting from the treatment of a similar fat under similar ester interchange conditions. More specifically the process involves:

(1) Forming a glyceride mixture from fat entering the process and a fraction of fat held from the previous batch of fat that has been through the process, as more fully hereinafter described, to produce a mixture for rearrangement;

(2) Subjecting the mixture to molecular rearrangement;

(3) Subjecting the rearranged mixture to fractionation;

(4) Separating the mixture into fractions;

(5) Returning at least one of the fractions thus formed to a portion of the fat, as is set forth in step 1 above, and repeating the operations, each time recovering that fraction or fractions not recycled.

It should be stated here that the fractionation step of the above process is not limited to just a simple separation of the rearranged fat into a solid and a liquid fraction but is to include as conditions demand, more involved fractionations such as for example separation of either the solid or liquid fraction of a primary separation into secondary solid and liquid fractions.

Two procedures to which I am not necessarily limited are outlined below in flow diagram for the purpose of illustrating more clearly the above steps, it being understood that these diagrams are to be considered as descriptive examples not necessarily limiting the scope of the invention.

A. Process suitable for making a product which is plastic over a wide range of temperatures.

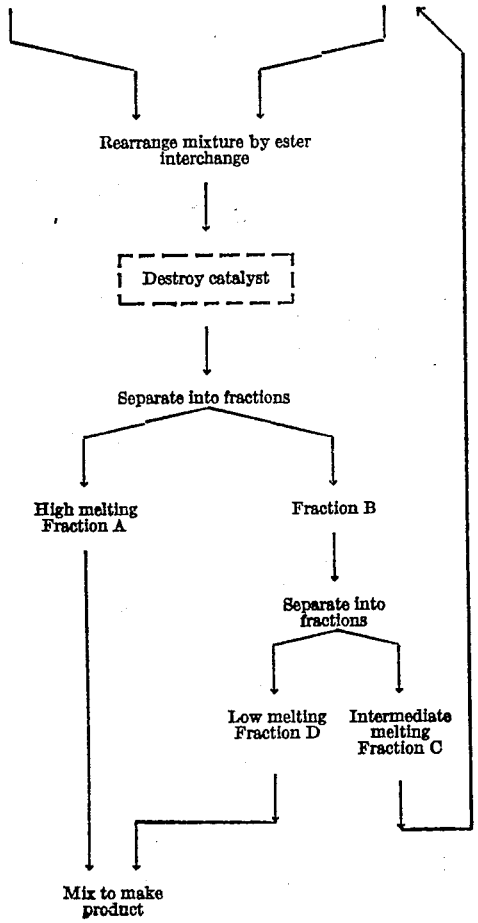

B. Process suitable for making a sharp melting fat like cocoa butter.

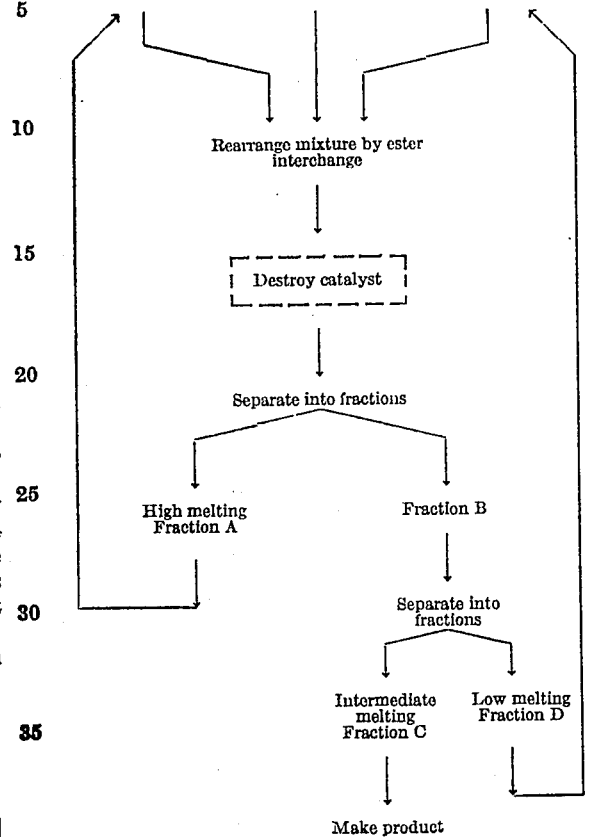

The result of re-cycling as noted in the two charts, as examples, is that a condition is reached after several stages in the operation where the glyceride mixture subject to rearrangement consists of a certain amount of fresh fat supply of substantially uniform character, and a certain amount of a recycled fraction or fractions also of a substantially uniform character and obtained in fractionating the rearranged fat mixture from the previous stage in the operation. The fraction not recycled constitutes the product desired for use. The mixture for rearrangement will contain as the fresh fat portion an amount which is substantially equal in weight to the fraction or mixture of fractions of the rearranged fat withdrawn for use as the desired product at each stage. Furthermore, the rearrangement which is effected in the particular mixed charge is one which will produce that proportion of the desired type fat that is being withdrawn, as well as the proportion of recycled material that makes up the succeeding charge.

As a result of the selection by the fractionation procedure of the amount and type of fat to withdraw from each cycle for use, there has been brought about a control of the effects produced by rearrangement. Furthermore, the combined fatty acid content of the withdrawn material will be the same as that of the fresh fat supplied except that the arrangement thereof in the glyceride molecules will be modified.

Because of the molecular rearrangement and the manner of fractionation, the physical and chemical characteristics of the resulting product will be substantially different from those characteristics possessed by the original fat although the fatty acid composition will be substantially the same. It is possible, as shown above, to rearrange the fatty acid radicals so that a sharp melting glyceride mixture is obtained or so that a product melting over a wide range of temperatures is the result. Various glyceride structures possible which would contain all the constituents of the original oil can be made a reality merely by the removal of the proper fraction or fractions from the cyclic operation. Thus it is possible to duplicate certain desirable natural glyceride structures with readily available fats by practicing the present process on a glyceride mixture containing the kinds and amounts of fatty acids desired in the final product and by selection of the proper fraction or fractions of the rearranged glycerides.

The process, therefore, is applicable not only to all natural oils and fats, but also to their hydrogenated or partially hydrogenated derivatives and mixtures made therefrom.

A clear understanding of the possibilities of the process will be obtained from a study of the following examples which are given merely by way of illustration. Since very active alkoxide catalysts are employed, the usual precautions of having the oil dry and neutral, the catalyst finely divided and well dispersed, and of excluding oxygen and carbon dioxide during the reaction, should be observed in order to achieve optimum results.

*Example I.—Rearrangement of hydrogenated soybean oil at 120° F. without simultaneous crystallization*

FIRST CYCLE
Hydrogenated soybean oil (A) 100 parts

Rearranged 45 min. at 120° F.; 0.4% sodium methoxide catalyst

Catalyst inactivated with acid; oil washed and filtered

Rearranged oil dissolved in 4 volumes 93:7 acetone-alcohol; stirred 2 hrs. at 65° F.; filtered by suction

- Solid (B) 4.8 parts solvent free
- Liquid

With solvent still present, cooled to 20° F. overnight

- Liquid (C) 38.2 parts solvent free
- Solid (D) 57.0 parts solvent free

Fraction (BC) for use — 43 parts

SECOND CYCLE
Mixture (E) of solid (D) 57.0 parts and 43 parts hydrogenated soybean oil (A)

Rearranged as in first cycle

Catalyst inactivated as in first cycle

Dissolved in solvent, crystallized and filtered as in first cycle

- Solid (F) 8.8 parts solvent free
- Liquid

With solvent still present, crystallized and filtered as in first cycle

- Liquid (G) 34.3 parts solvent free
- Solid (H) 56.9 parts solvent free

Fraction (FG) for use — 43.1 parts

THIRD CYCLE
Mixture (I) of Solid (H) 56.9 parts and 43.1 parts hydrogenated soybean oil (A)

Rearranged as in first cycle

Catalyst inactivated as in first cycle

Dissolved in solvent, crystallized and filtered as in first cycle

- Solid (J) 13.0 parts solvent free
- Liquid

With solvent still present, crystallized and filtered as in first cycle

- Liquid (K) 37.1 parts solvent free
- Solid (L) 49.9 parts solvent free

Fraction (JK) for use — 50.1 parts

FOURTH CYCLE
Substantially the same as the third.

The fraction (L) had an iodine value of 67.4 and may be reworked in the fourth cycle, 49.9 parts being mixed with 50.1 parts of the original hydrogenated soybean oil. Fraction (JK) had an iodine value of 76.9, substantially the same as the iodine value of 77.5 possessed by the oil entering the process. However, being a mixture of solid fraction (J) and liquid fraction (K) the product possessed distinctly different physical properties than the original oil of substantially the same iodine value. The difference between the two glycerides was clearly apparent in a comparison of the plastic products made therefrom in that the product of my process was softer at low temperatures and firmer at high temperatures than the untreated hydrogenated soybean oil.

It will be noted also in Example I above that the glyceride mixture is subjected to rearrangement wholly in the liquid phase. This step of the operation is preferably carried out at moderate temperatures with the aid of a sodium or potassium alkoxide low temperature catalyst. However, high temperatures in the range of 200 to 300° C. such as have been used in known methods of rearrangement involving the use of no catalyst or less active catalysts that the alkoxide compounds mentioned above may be employed, but the use of such high temperatures of course suffers the disadvantage that thermal decomposition of the fat may take place. Obviously it is preferable to employ the more active catalysts and conduct the rearrangement at relatively low temperature and thereby obtain the added advantages of economy and simplicity of operation also characteristic of low temperature work as compared with high temperature procedures.

The molecular rearrangement step of the present process, if desired, may also be conducted in accordance with the method described and claimed in my copending application Serial No. 418,590, now abandoned, involving conditions permitting simultaneous crystallization of solid triglycerides during the molecular rearrangement. In such applications of the invention the use of the more active alkoxide catalysts is necessary in order that ester interchange may take place at the relatively low temperatures necessarily employed. The following example will illustrate the use of this method of molecular rearrangement in my process.

*Example II.—Rearrangement of hydrogenated soybean oil at 70° F. with simultaneous crystallization*

FIRST CYCLE
Melted hydrogenated soybean oil (A) 100 parts

Rearranged 8.5 hrs. at 80° F., 39.5 hrs. at 70° F.; 0.4% sodium methoxide catalyst Catalyst inactivated with acid; oil heated, washed and filtered Rearranged oil dissolved in 4 volumes 93:7 acetone-alcohol agitated 1 hr. at 80° F.; filtered by suction {Solid (B) 6.7 parts solvent free
{Liquid With solvent still present, cooled to 20° F. overnight and filtered by suction — Fraction (BC) for use 50.8 parts {Liquid (C) 44.1 parts solvent free
{Solid (D) 49.2 parts solvent free SECOND CYCLE
Melted mixture (E) of solid (D) 49.2 parts and 50.8 parts hydrogenated soybean oil (A)

Rearranged 40.5 hrs. at 70° F. as in first cycle

Catalyst inactivated as in first cycle

Dissolved in solvent as in first cycle; agitated 2 hrs. at 80° F.; filtered by suction {Solid (F) 12.5 parts solvent free
{Liquid With solvent still present, crystallized and filtered as in first cycle — Fraction (FG) for use 50.3 parts {Liquid (G) 37.8 parts solvent free
{Solid (H) 49.7 parts solvent free THIRD CYCLE
Melted mixture (I) of solid (H) 49.7 parts and 50.3 parts hydrogenated soybean oil (A)

Rearranged 39.5 hrs. at 70° F. as in first cycle

Catalyst inactivated as in first cycle

Dissolved in solvent, crystallized and filtered as in first cycle

{Solid (J) 13.2 parts solvent free
{Liquid

With solvent still present, crystallized and filtered as in first cycle — Fraction (JK) for use 53.1 parts {Liquid (K) 39.9 parts solvent free
{Solid (L) 46.9 parts solvent free FOURTH CYCLE
Same substantially as the third, etc.

In this example the fraction (L) had an iodine value of 66.8 and may be reworked in the fourth cycle, 46.9 parts being mixed with 53.1 parts of the original hydrogenated soybean oil. Fraction (JK) had an iodine value of 77.6 as compared with 77.5 for the original oil, but being a mixture of a solid fraction and a liquid fraction, it was distinctly different in properties despite the fact that the proportions of combined saturated and unsaturated fatty acids were substantially the same. The product (JK) of this arrangement was also suitable for the production of a product which had plastic qualities over a wider range of temperatures than a comparable product prepared from the original oil.

In the use of the more active alkoxide catalysts, I find it preferable after the rearrangement has been effected and before radical change is made in the temperature of the fat to inactivate the catalyst, such as by treatment with acids, so as to avoid any further molecular changes which may occur undesirably during subsequent operations on the modified fat. In my preferred procedure the catalyst is inactivated, especially if the rearrangement reaction is conducted at temperatures above the melting point of the fat so that optimum crystallization and separation conditions may be used without danger of undesirable further rearrangement occurring simultaneously.

The graining and separation steps following molecular rearrangement are preferably carried out under controlled conditions so that an end product of substantially constant characteristics results, the specific conditions depending entirely on the type of end product desired. The crystallization and separation may be done suitably with the aid of a solvent such as commercial hexane, or the use of the solvent may be omitted in which case crystallization of the fat is preferably followed by filtration or hydraulic pressing. Other methods of separating fat into fractions differing from each other in composition, such as liquid-phase separations with the aid of solvents that are partially miscible with the fat, may also be employed. In the claims the word "fraction" is used in its chemical sense to designate a portion of the whole separated by difference in physical property such as melting point, crystallization point, solubility in solvent and the like.

The process of my invention may be utilized in the preparation of a number of products which ordinarily could not be produced except from certain types of fat possessing characteristics suitable for use in the production of such products. Among the possible applications are the following: production of sharp melting confectioners' butter (cocoa butter substitute) from domestic fats; production of improved margarine fats either from domestic animal and vegetable fats or mixtures of these with coconut oil type fats; production of shortenings of improved flavor stability containing high proportions of hydrogenated bean oil or hydrogenated marine oil involving hydrogenating the respective oils to iodine values lower than the average employed in the production of such products, and then softening the hydrogenated fat or its mixture with softer fat by controlled rearrangement of the present invention; production of fats which do not foam in deep frying operations, from mixtures of coconut oil with fats containing predominantly fatty acids of eighteen carbon atoms; production of wax substitutes from glycerides; production of special fats for manufacture of shortenings with improved creaming volume, digestibility, shortening value, etc. The invention may be applied to many other important fields of fat chemistry.

Having thus described my invention, what I claim and desire to secure by Letters Patent is:

1. In the process of effecting ester interchange in a glyceride fat constituted of combined fatty acids of a plurality of kinds, the steps of mixing with said fat prior to ester interchange a mixture of glycerides resulting from a previous ester interchange conducted under similar conditions and from which has been removed a glyceride fraction containing combined fatty acids substantially corresponding in kind and proportion to the combined fatty acids of said fat and subjecting the resulting mixture of glycerides containing said fat to ester interchange.

2. The process of modifying glyceride fats by ester interchange, which consists essentially in effecting an initial ester interchange of a given fat constituted of combined fatty acids of a plurality of kinds, withdrawing from the resulting product a desired fraction whose combined fatty acids substantially correspond to the combined fatty acids of said fat, again effecting an ester interchange, this time using a mixture of the remaining fraction and a further supply of the given fat substantially equal in weight to that of the withdrawn fraction, withdrawing from the second ester interchange a desired fraction whose combined fatty acids substantially correspond to the combined fatty acids of said fat, and so proceeding with the addition of fat and recycling and withdrawal of respective fractions.

3. In the process of rearranging by ester interchange the molecular structure of a fat constituted of combined fatty acids of a plurality of kinds, the steps which comprise subjecting a mixture of glycerides containing said fat to ester interchange, separating the glycerides resulting from said interchange into solid and liquid fractions, mixing the liquid fraction with a portion of fat to be subjected to ester interchange, the said portion being substantially equal in weight to that of the solid fraction, subjecting the resulting mixture to ester interchange and separating the product of the second mentioned ester interchange into solid and liquid fractions, the said solid fractions each being constituted of combined fatty acids substantially corresponding in kind and proportion to the combined fatty acids of said fat.

4. In the process of rearranging by ester interchange the molecular structure of a fat constituted of combined fatty acids of a plurality of kinds, the steps which comprise subjecting a mixture of glycerides containing said fat to ester interchange, separating the glycerides resulting from said ester interchange into solid and liquid fractions, mixing the solid fraction with a portion of said fat to be subjected to ester interchange, the said portion being equal in weight to that of the liquid fraction, subjecting the resulting mixture to ester interchange and thereafter separating the product of the second mentioned ester interchange into solid and liquid fractions, the said liquid fractions each being constituted of combined fatty acids substantially corresponding in kind and proportion to the combined fatty acids of said fat.

5. In the process of rearranging by ester interchange the molecular structure of a fat constituted of combined fatty acids of a plurality of kinds, the steps which comprise subjecting a mixture of glycerides containing said fat to ester interchange, separating the rearranged fat resulting from said ester interchange into solid and liquid fractions, separating the liquid fraction into a second solid and a second liquid fraction, combining the first solid fraction and the second liquid fraction with a portion of said fat to be subjected to ester interchange, the said portion being substantially equal in weight to that of the second solid fraction, and subjecting the resulting mixture to ester interchange, the second solid fraction being constituted of combined fatty acids substantially corresponding in kind and proportion to the combined fatty acids of said fat.

6. In the process of rearranging by ester interchange the molecular structure of a fat constituted of combined fatty acids of a plurality of kinds, the steps which comprise subjecting a mixture of glycerides containing said fat to ester interchange, separating the fat resulting from said ester interchange into solid and liquid fractions, fractionating the liquid fraction into a second solid and a second liquid fraction, combining the second solid fraction with a portion of said fat to be subjected to ester interchange, the said portion being substantially equal in weight to that of the combined weights of the first solid fraction and the second liquid fraction, and subjecting the resulting mixture to ester interchange, the constitution of the combined fatty acids of the first solid fraction and the second liquid fraction substantially corresponding in kind and proportion to the combined fatty acids of said fat.

7. In the process of rearranging by ester interchange the molecular structure of a fat constituted of fatty acids of a plurality of kinds, the steps which comprise subjecting a mixture of glycerides containing said fat to ester interchange, separating the mixture of glycerides resulting from said ester interchange into fraction A and fraction B, fraction A being higher melting than fraction B, separating fraction A into fraction C and fraction D, fraction C being higher melting than fraction D, combining fractions C and B to constitute the desired product of ester interchange, which product contains combined fatty acids substantially corresponding in kind and proportion to the combined fatty acids of said fat, and mixing fraction D with a succeeding portion of said fat, said portion being substantially equal in weight to that of combined fractions C and B, and subjecting the mixture to ester interchange.

8. In the process of rearranging by ester interchange the molecular structure of a fat constituted of combined fatty acids of a plurality of kinds, the steps which comprise subjecting a mixture of glycerides containing said fat to ester interchange, separating the mixture of glycerides resulting from said ester interchange into fraction A and fraction B, fraction A being higher melting than fraction B, separating fraction A into fraction C and fraction D, fraction C being higher melting than fraction D, selecting fraction D to constitute the desired product of ester interchange which fraction D contains combined fatty acids substantially corresponding in kind and proportion to the combined fatty acids of said fat, and mixing fractions C and B with a succeeding portion of said fat, which portion is substantially equal in weight to that of fraction D, and subjecting the mixture to ester interchange.

9. A cyclic process for effecting ester interchange in a fat constituted of combined fatty acids of a plurality of kinds comprising subjecting a mixture of glycerides containing said fat to ester interchange, fractionating the resulting product and separating the fractions, selecting from said fractions a combination of glycerides containing combined fatty acid radicals substantially corresponding in kind and proportion to those in the said fat in the original mixture of glycerides but differing in arrangement in the glycerides molecules and recycling the unselected fractions and reacting same in further ester interchange with a fresh portion of said fat, which portion is substantially equal in weight to the selected combination of glycerides.

10. The process of subjecting a glyceride fat constituted of combined fatty acids of a plurality of kinds to interesterification involving a series of successive interesterification steps essentially uniform as to controlling conditions, which comprises following each interesterification step (a) by fractionating the reaction mixture into a plurality of glyceride fractions differing from one another in physical property, and then (b) by withdrawing as a product of the process one or more of said fractions, the total combined fatty acids of which substantially correspond in kind and proportion to the total combined fatty acids of the glyceride fat subjected to said process; and employing in each successive interesterification step a mixture of glycerides consisting of (1) the portion of the reaction mixture of the preceding step which was not withdrawn and (2) a new portion of said glyceride fat substantially equal in amount to the amount of product withdrawn in the preceding step.

11. A cyclic process for rearranging fatty acid radicals in fats constituted of combined fatty acids of a plurality of kinds comprising subjecting a mixture of glycerides containing said fat to ester interchange, separating the resulting glycerides into fractions, recycling a selected fraction and reacting same with fresh fat in further ester interchange, and withdrawing for use the fraction not recycled, whereby for each increment of fat added in each cycle there is withdrawn a rearranged fat of the same combined fatty acid content, but of a selected physical behavior and chemical composition.

12. In the process of reshuffling the fatty acid radicals of a triglyceride fat containing saturated and unsaturated fatty acid radicals, the steps of controlling the relative proportions of trisaturated glycerides, saturated-unsaturated triglycerides, and tri-unsaturated glycerides in the final fat product, without the formation of by-product end fractions containing other than desired relative proportions of said glycerides, which comprise: (1) subjecting a mixture of triglycerides containing said fat to ester interchange, (2) separating the modified triglycerides into a plurality of fractions at least one of which is selected as a portion relatively rich in triglycerides of the character particularly desired in the final product and containing combined fatty acids substantially corresponding in kind and proportion to the combined fatty acids of said triglyceride fat, (3) mixing the remainder of the modified triglycerides, which does not include the aforesaid portion rich in desired triglycerides, with a portion of the original triglyceride fat substantially equal in amount to the separated portion rich in desired triglycerides, (4) subjecting the mixture thus formed to ester interchange in a manner similar to that employed in step (1), and continuing with steps corresponding to said steps (2) and (3), and repeating this cycle as often as desired; whereby with each complete cycle a new portion of the original fat is introduced to the process, a new portion of final product is removed which is substantially the same in weight as the newly introduced portion of original fat and which contains corresponding fatty acid radicals in substantially the same proportions but resuffled within the glyceride molecules to produce a product of desired physical characteristics, and the by-product remainder is returned to the process.

13. The process of claim 1, in which the sequence of steps is repeated a plurality of times, the amount of added fresh fat each time being substantially equal in weight to the fraction of the previous rearranged fat that is not used in the succeeding charge.

14. The process of claim 1, in which the ester interchange step is conducted in the liquid phase.

15. The process of claim 1, in which the ester interchange step is conducted in the presence of a low temperature ester interchange catalyst at a temperature below that at which solid triglycerides begin to separate from the mixture.

16. The process of claim 1, in which the proportion of the recycled fraction in the mixture subjected to ester interchange is substantially the same as its proportion in the mixture of rearranged fat from which it was derived.

EDDY W. ECKEY.

REFERENCES CITED

The following references are of record in the file of this patent:

UNITED STATES PATENTS

| Number | Name | Date |
|---|---|---|
| 1,744,596 | Van Loon | Jan. 21, 1930 |
| 1,873,513 | Van Loon | Aug. 23, 1932 |
| 2,183,981 | Bennett | Dec. 19, 1939 |
| 2,205,381 | Eckey | June 25, 1940 |
| 2,309,949 | Gooding | Feb. 2, 1943 |